(12) United States Patent
Pacetti

(10) Patent No.: US 7,288,609 B1
(45) Date of Patent: Oct. 30, 2007

(54) COATINGS FOR DRUG DELIVERY DEVICES BASED ON POLY (ORTHOESTERS)

(75) Inventor: Stephen D. Pacetti, San Jose, CA (US)

(73) Assignee: Advanced Cardiovascular Systems, Inc., Santa Clara, CA (US)

( * ) Notice: Subject to any disclaimer, the term of this patent is extended or adjusted under 35 U.S.C. 154(b) by 281 days.

(21) Appl. No.: 10/382,197

(22) Filed: Mar. 4, 2003

(51) Int. Cl.
*C08G 65/48* (2006.01)
*C08G 4/00* (2006.01)

(52) U.S. Cl. ............ 525/539; 525/472; 528/220; 528/392; 528/403; 528/406; 528/425

(58) Field of Classification Search ............ 525/539, 525/472; 528/220, 392, 425, 403, 406
See application file for complete search history.

(56) References Cited

U.S. PATENT DOCUMENTS

| | | | | |
|---|---|---|---|---|
| 4,733,665 A | 3/1988 | Palmaz | ............ | 128/343 |
| 4,800,882 A | 1/1989 | Gianturco | ............ | 128/343 |
| 4,886,062 A | 12/1989 | Wiktor | ............ | 128/343 |
| 4,977,901 A | 12/1990 | Ofstead | ............ | 128/772 |
| 5,112,457 A | 5/1992 | Marchant | ............ | 204/165 |
| 5,328,471 A | 7/1994 | Slepian | ............ | 604/101 |
| 5,455,040 A | 10/1995 | Marchant | ............ | 424/426 |
| 5,464,650 A | 11/1995 | Berg et al. | ............ | 427/2.3 |
| 5,578,073 A | 11/1996 | Haimovich et al. | ............ | 623/1 |
| 5,605,696 A | 2/1997 | Eury et al. | ............ | 424/423 |
| 5,667,767 A | 9/1997 | Greff et al. | ............ | 424/9.411 |
| 5,670,558 A | 9/1997 | Onishi et al. | ............ | 523/112 |
| 5,700,286 A | 12/1997 | Tartaglia et al. | ............ | 623/1 |
| 5,716,981 A | 2/1998 | Hunter et al. | ............ | 514/449 |
| 5,824,049 A | 10/1998 | Ragheb et al. | ............ | 623/1 |
| 5,830,178 A | 11/1998 | Jones et al. | ............ | 604/49 |
| 5,837,228 A * | 11/1998 | Shih et al. | ............ | 424/78.37 |
| 5,837,313 A | 11/1998 | Ding et al. | ............ | 427/2.21 |
| 5,851,508 A | 12/1998 | Greff et al. | ............ | 424/9.411 |
| 5,858,746 A | 1/1999 | Hubbell et al. | ............ | 435/177 |
| 5,865,814 A | 2/1999 | Tuch | ............ | 604/265 |
| 5,873,904 A | 2/1999 | Ragheb et al. | ............ | 623/1 |
| 5,968,543 A * | 10/1999 | Heller et al. | ............ | 424/425 |
| 5,971,954 A | 10/1999 | Conway et al. | ............ | 604/96 |
| 5,980,928 A | 11/1999 | Terry | ............ | 424/427 |
| 5,980,972 A | 11/1999 | Ding | ............ | 427/2.24 |
| 6,015,541 A | 1/2000 | Greff et al. | ............ | 424/1.25 |
| 6,042,875 A | 3/2000 | Ding et al. | ............ | 427/2.24 |
| 6,051,648 A | 4/2000 | Rhee et al. | ............ | 525/54.1 |
| 6,056,993 A | 5/2000 | Leidner et al. | ............ | 427/2.25 |
| 6,060,451 A | 5/2000 | DiMaio et al. | ............ | 514/13 |
| 6,080,488 A | 6/2000 | Hostettler et al. | ............ | 428/423.3 |
| 6,096,070 A | 8/2000 | Ragheb et al. | ............ | 623/1 |
| 6,099,562 A | 8/2000 | Ding et al. | ............ | 623/1.46 |
| 6,110,188 A | 8/2000 | Narciso, Jr. | ............ | 606/153 |
| 6,113,629 A | 9/2000 | Ken | ............ | 623/1.1 |
| 6,120,536 A | 9/2000 | Ding et al. | ............ | 623/1.43 |
| 6,120,904 A | 9/2000 | Hostettler et al. | ............ | 428/423.3 |
| 6,121,027 A | 9/2000 | Clapper et al. | ............ | 435/180 |
| 6,129,761 A | 10/2000 | Hubbell | ............ | 623/11 |
| 6,153,252 A | 11/2000 | Hossainy et al. | ............ | 427/2.3 |
| 6,165,212 A | 12/2000 | Dereume et al. | ............ | 623/1.13 |
| 6,822,000 B2 * | 11/2004 | Ng et al. | ............ | 514/510 |

FOREIGN PATENT DOCUMENTS

| | | |
|---|---|---|
| EP | 0 665 023 | 8/1995 |
| EP | 0 970 711 | 1/2000 |
| WO | WO 00/12147 | 3/2000 |
| WO | WO 00/64506 | 11/2000 |
| WO | WO 01/01890 | 1/2001 |

* cited by examiner

*Primary Examiner*—Ana L. Woodward
(74) *Attorney, Agent, or Firm*—Squire, Sanders & Dempsey, LLP

(57) ABSTRACT

A polymer coating for implantable medical devices based on polyorthoesters and methods for fabricating the coating are disclosed. The implantable medical devices made of polyorthoesters and methods for fabricating thereof are also disclosed.

11 Claims, No Drawings

COATINGS FOR DRUG DELIVERY DEVICES BASED ON POLY (ORTHOESTERS)

BACKGROUND OF THE INVENTION

1. Field of the Invention

This invention is directed to coatings for implantable medical devices, such as drug eluting vascular stents.

2. Description of the State of the Art

Percutaneous transluminal coronary angioplasty (PTCA) is a procedure for treating heart disease. A catheter assembly having a balloon portion is introduced percutaneously into the cardiovascular system of a patient via the brachial or femoral artery. The catheter assembly is advanced through the coronary vasculature until the balloon portion is positioned across the occlusive lesion. Once in position across the lesion, the balloon is inflated to a predetermined size to radially compress against the atherosclerotic plaque of the lesion to remodel the lumen wall. The balloon is then deflated to a smaller profile to allow the catheter to be withdrawn from the patient's vasculature.

Problems associated with the above procedures includes formation of intimal flaps or torn arterial linings which can collapse and occlude the conduit after the balloon is deflated. Moreover, thrombosis and restenosis of the artery may develop over several months after the procedure, which may require another angioplasty procedure or a surgical by-pass operation. To reduce the partial or total occlusion of the artery by the collapse of arterial lining and to reduce the chance of the development of thrombosis and restenosis, a stent is implanted in the lumen to maintain vascular patency.

Stents are used not only as a mechanical intervention but also as a vehicle for providing biological therapy. As a mechanical intervention, stents act as scaffoldings, functioning to physically hold open and, if desired, to expand the wall of the passageway. Typically, stents are capable of being compressed, so that they can be inserted through small vessels via catheters, and then expanded to a larger diameter once they are at the desired location. Examples in patent literature disclosing stents which have been applied in PTCA procedures include stents illustrated in U.S. Pat. No. 4,733,665 issued to Palmaz, U.S. Pat. No. 4,800,882 issued to Gianturco, and U.S. Pat. No. 4,886,062 issued to Wiktor.

Biological therapy can be achieved by medicating the stents. Medicated stents provide for the local administration of a therapeutic substance at the diseased site. In order to provide an efficacious concentration to the treated site, systemic administration of such medication often produces adverse or toxic side effects for the patient. Local delivery is a preferred method of treatment in that smaller total levels of medication are administered in comparison to systemic dosages, but are concentrated at a specific site. Local delivery thus produces fewer side effects and achieves more favorable results. One proposed method for medicating stents involves the use of a polymeric carrier coated onto the surface of a stent. A solution which includes a solvent, a polymer dissolved in the solvent, and a therapeutic substance dispersed in the blend is applied to the stent. The solvent is allowed to evaporate, leaving on the stent surface a coating of the polymer and the therapeutic substance impregnated in the polymer. Once the stent has been implanted at the treatment site, the therapeutic substance has a sustained release profile from the polymer.

Local administration of therapeutic agents via stents has shown some favorable results in reducing restenosis. However, the biological compatibility of stent coatings or stents can be improved. For example, the ability of the surface of the stent coating to repel proteins can be improved. A surface that does not adsorb proteins, or that adsorbs only a minimal amount of proteins, is herein referred to as a "non-fouling" surface.

Accordingly, there is a need to have stent coatings with improved biological compatibility. The embodiments of the present invention are directed to polymers and combination of polymers that satisfy this need.

SUMMARY

According to one embodiment of this invention, a coating for medical devices is provided. The coating comprises a polymer that is a product of co-polycondensation of a diketene acetal, a hydroxylated functional compound and a diol. The diketene acetal can be 3,9-diethylidene-2,4,8,10-tetraoxaspiro-[5,5]-undecane; 3,9-dipentylidene-2,4,8,10-tetraoxaspiro-[5,5]-heptadecane; or mixtures thereof. The hydroxylated functional compound can be poly(alkylene glycols), hydroxylated poly(vinyl pyrrolidone), dextran, dextrin, hyaluronic acid, derivatives of hyaluronic acid, poly(2-hydroxyethyl methacrylate), or mixtures thereof. Diols can be alkylene glycols, oligoalkylene glycols, cycloaliphatic diols, or mixtures thereof.

According to another embodiment of the present invention, the coating comprises a polymer having the formula

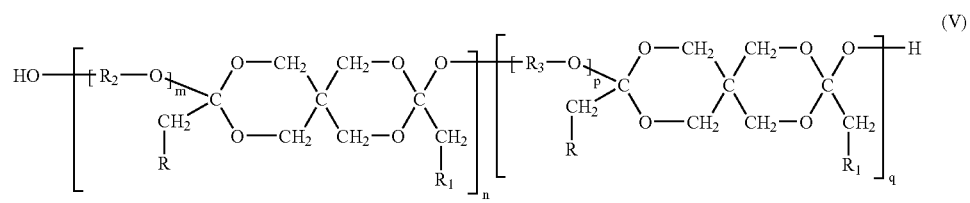

wherein:

R and $R_1$ are each, independently, an unsubstituted or substituted straight-chained, branched, or cyclic, $C_1$-$C_8$ alkyl radical, or unsubstituted or substituted aryl radical;

$R_2$ is the repeating unit of the moiety providing the polymer with non-fouling characteristics;

$R_3$ is an aliphatic or cycloaliphatic group;

m, n, p, and q are all integers, where the value of m is from 5 to 500, the value of n is from 2 to 350, the value of p is from 1 to 20, and the value of q is from 10 to 550.

According to yet another embodiment of the present invention, a method for fabricating a polymer coating for a medical device is provided. The method comprises applying a polymer onto the surface of the device, wherein the polymer comprises a product of co-polycondensation of a diketene acetal, a hydroxylated functional compound and a diol.

According to another embodiment of the present invention, an implantable medical device is disclosed. The implantable medical device is made of a polymer comprising a product of co-polycondensation of a diketene acetal, a hydroxylated functional compound and a diol.

DETAILED DESCRIPTION

A coating for an implantable medical device, such as a stent, according to one embodiment of the present invention, can include an optional primer layer, a drug-polymer layer (also referred to as "reservoir" or "reservoir layer") or a polymer-free drug layer, and an optional topcoat layer. The drug-polymer layer serves as a reservoir for the drug. The reservoir layer or the polymer-free drug layer can be applied directly onto the stent surface. The optional primer layer can be applied on the stent surface to improve the adhesion of the drug-polymer layer or the polymer-free drug layer to the stent. The optional topcoat layer, which can be essentially free from any drugs, serves as a rate limiting membrane that helps to control the rate of release of the drug.

According to the present invention, polyorthoesters are polymers that can be used to make any or all of the optional primer layer, the reservoir layer, and/or the optional topcoat layer. To obtain polyorthoesters that are suitable for making stent coatings, at least one compound of Group I is reacted with at least one compound of Group II and at least one compound of Group III. Groups I, II, and III are described below.

Group I. Diketene Acetals

Ketenes are compounds having carbonyl bond and carbon-carbon double bond adjacent each other and can be generally described by the formula $>C=C=O$. Diketenes, consequently, are compounds comprising two ketene groups. Diketene acetals include two reactive centers capable of reacting with two hydroxy functional molecules to serve as a linking agent. Diketene acetals have a general formula (I)

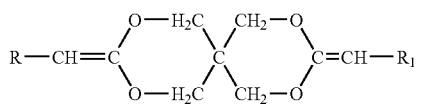

(I)

where R and $R_1$ can be, independently, unsubstituted or substituted straight-chained, branched, or cyclic, $C_1$-$C_8$ alkyl radicals, or unsubstituted or substituted aryl radicals. Any suitable substitutent as selected by those having ordinary skill in the art can be present in the substituted radicals.

Examples of suitable diketene acetals described by formula (I) that can be used include 3,9-diethylidene-2,4,8,10-tetraoxaspiro-[5,5]-undecane (DETOSU), 3,9-dipentylidene-2,4,8,10-tetraoxaspiro-[5,5]-heptadecane (DPTOSH), 3,9-dibutylidene-2,4,8,10-tetraoxaspiro-[5,5]-pentadecane, 3,9-dipropylidene-2,4,8,10-tetraoxaspiro-[5,5]-tridecane and mixtures thereof. Those having ordinary skill in the art can synthesize diketene acetals, as described in the literature, for example, in *Heller J., Adv. Polymer Sci., vol.* 107, pp. 41-92 (1993).

Formula (I) describes the molecule of DETOSU where both R and $R_1$ are methyl groups. Consequently, DETOSU has the formula (II):

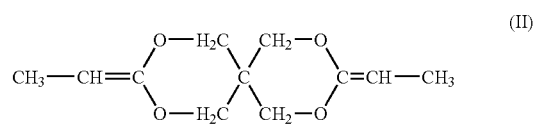

(II)

For DPTOSH, both R and $R_1$ are n-butyl groups.

Group II. Hydroxy Functional Compounds

Group II comprises hydroxylated compounds having non-fouling characteristics. The hydroxylated compounds can react with the diketene acetal to form soft segments of polyorthoesters. The soft segments can have a glass transition temperature ($T_g$) below body temperature, e.g., for humans, below about 37° C. The hydroxyl group can be located in a terminal or non-terminal position of the molecule. Examples of suitable hydroxy functional compounds include poly(alkylene glycols), for example, poly(ethylene glycol) (PEG), poly(propylene glycol) (PPG) or poly(tetramethylene glycol), PLURONIC surfactants, hydroxylated poly(vinyl pyrrolidone), dextran, dextrin, hyaluronic acid and its derivatives such as sodium hyaluronate, and poly(2-hydroxyethyl methacrylate), or mixtures thereof. PLURONIC is a trade name of poly(ethylene oxide-co-propylene oxide) and is available from BASF Corp. of Parsippany, N.J.

The molecular weight of a suitable compound of Group II can be such so as to allow passage of the released molecule through the kidneys, for example, below 40,000 Daltons, such as between about 300 and 20,000 Daltons.

Compounds of Group II can be described by the general formula (III):

(III)

where "m" is an integer, and —$R_2$—O— represents the moiety of compound (III) providing non-fouling characteristics. For example, when compound (III) is a poly(alkylene glycol), $R_2$ is the polymethylene structure $(CH_2)_x$, where "x" is an integer. To illustrate for compound (III) being PEG, x=2.

Group III. Diols

Group III comprises short-to-moderate-length aliphatic or cycloaliphatic diols or blends or combinations thereof. The diols can react with the diketene acetal to form hard segments of polyorthoesters. The hard segments can either have some crystallinity or have a $T_g$ above body temperature, e.g., about 37° C. The hard segments can serve as quasi cross-linking agents both strengthening the final polyorthoester and enabling the polyorthoester to behave as an elastomer. Examples of suitable diols include alkylene glycols, for example, $C_2$ through $C_{16}$ α,ω-glycols such as ethylene glycol ($C_2$), propylene glycol ($C_3$), butane-1,4-diol ($C_4$), pentane-1,5-diol ($C_5$), hexane-1,6-diol ($C_6$), heptane-1,7-diol ($C_7$), octane-1,8-diol ($C_8$), nonane-1,9-diol ($C_9$), decane-1,10-diol ($C_{10}$), undecane-1,11-diol ($C_{11}$), dodecane-1,12-diol ($C_{12}$), tridecane-1,13-diol ($C_{13}$), tetradecane-1,14-diol ($C_{14}$), pentadecane-1,15-diol ($C_{15}$), hexadecane-1,16-diol ($C_{16}$), or mixtures thereof, or other alkylene glycols, for example, butane-1,3-diol, pentane-2,4-diol, hexane-2,5-diol, or mixtures thereof. Other aliphatic diols that can be used include oligoalkylene glycols such as diethylene glycol, trimethylene glycol, tetramethylene glycol, tetraethylene glycol, poly(tetraethylene glycol), poly(propylene glycol), and mixtures thereof. Examples of suitable cycloaliphatic diols include trans-cyclohexanedimethanol, 1,4-cyclohexanediol, and mixtures thereof.

Compounds of Group III can be described by the general formula (IV):

where $R_3$ represents an aliphatic or cycloaliphatic group. For example, when compound (IV) is an alkylene glycol, $R_3$ is the poly- or oligomethylene structure $(CH_2)_y$, where "y" is an integer from 2 to 16. To illustrate, when compound (IV) is ethylene glycol, y=2. In case of propylene glycol, y=3.

According to embodiments of the present invention, one way of preparing polyorthoesters is to use a two-step synthetic process. The first step includes reacting the whole amount of diketene acetal of Group I with a hydroxy functional compound of Group II. The reaction ("reaction 1") can be conducted in an anhydrous environment at an elevated temperature, for example, about 80° C., and can be catalyzed by a strong acid or base, e.g., p-toluenesulfonic acid. The second step includes adding a diol of Group III to the product of reaction 1, which can be conducted at an elevated temperature, for example, about 80° C. As a result of the two-step process described above, a polyorthoester can be obtained, the polyorthoester having the general formula (V):

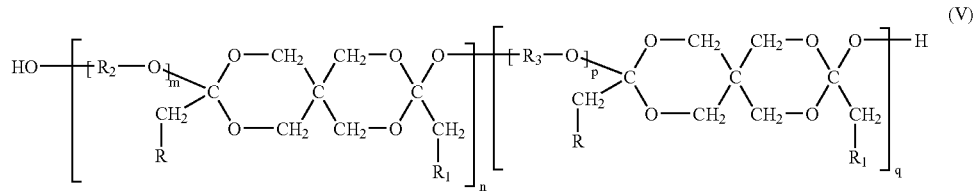

where R, $R_1$, $R_2$, and $R_3$ are as described above; m, n, p, and q are all integers, where the value of m is from about 5 to about 500, the value of n is from about 2 to about 350, the value of p is from about 1 to about 20, and the value of q is from about 10 to about 550. The polyorthoester described by formula (V) can have molecular weight within a range of from about 20,000 to about 200,000 Daltons.

Polyorthoesters of this invention can be used for making stent coatings. The coating can be applied onto the stent by a commonly used method known to one of ordinary skill in the art, for instance, by spraying, dipping or molding. The polyorthoesters can be used to fabricate a primer layer, a reservoir layer or a topcoat layer. The polyorthoesters can be used alone or in combination with other suitable polymers. Poly(ethylene-co-vinyl alcohol) (EVAL) is one example of a polymer than can be employed. EVAL is a product of hydrolysis of ethylene-vinyl acetate copolymers and may also be a terpolymer including up to 5 molar % of units derived from styrene, propylene and other suitable unsaturated monomers. EVAL is available from Sigma-Aldrich Co. of Milwaukee, Wis.

Representative examples of other suitable polymers include poly(hydroxyvalerate), poly(L-lactic acid), polycaprolactone, poly(lactide-co-glycolide), poly(hydroxybutyrate), poly(hydroxybutyrate-co-valerate), polydioxanone, polyorthoester, polyanhydride, poly(glycolic acid), poly(D,L-lactic acid), poly(glycolic acid-co-trimethylene carbonate), polyphosphoester, polyphosphoester urethane; poly (amino acids), cyanoacrylates, poly(trimethylene carbonate), poly(iminocarbonate), co-poly(ether-esters) (e.g. PEO/PLA), polyalkylene oxalates, polyphosphazenes, biomolecules (such as fibrin, fibrinogen, cellulose, starch, collagen and hyaluronic acid), polyurethanes, silicones, polyesters, polyolefins, polyisobutylene and ethylene-alpha-olefin copolymers, acrylic polymers and copolymers, vinyl halide polymers and copolymers (such as polyvinyl chloride), polyvinyl ethers (such as polyvinyl methyl ether), polyvinylidene halides (such as polyvinylidene fluoride and polyvinylidene chloride), polyacrylonitrile, polyvinyl ketones, polyvinyl aromatics (such as polystyrene), polyvinyl esters (such as polyvinyl acetate), copolymers of vinyl monomers with each other and olefins (such as ethylene-methyl methacrylate copolymers, acrylonitrile-styrene copolymers, ABS resins, and ethylene-vinyl acetate copolymers), polyamides (such as Nylon 66 and polycaprolactam), alkyd resins, other polycarbonates, polyoxymethylenes, polyimides, polyethers, epoxy resins, other polyurethanes, rayon, rayon-triacetate, cellulose, cellulose acetate, cellulose butyrate, cellulose acetate butyrate, cellophane, cellulose nitrate, cellulose propionate, cellulose ethers, soluble fluorinated polymers and carboxymethyl cellulose.

The drug can include any substance capable of exerting a therapeutic or prophylactic effect for a patient. The drug may include small molecule drugs, peptides, proteins, oligonucleotides, and the like. The drug could be designed, for example, to inhibit the activity of vascular smooth muscle cells. It can be directed at inhibiting abnormal or inappropriate migration and/or proliferation of smooth muscle cells to inhibit restenosis.

Examples of drugs include antiproliferative substances such as actinomycin D, or derivatives and analogs thereof (manufactured by Sigma-Aldrich, or COSMEGEN available from Merck). Synonyms of actinomycin D include dactinomycin, actinomycin IV, actinomycin $I_1$, actinomycin $X_1$, and actinomycin $C_1$. The active agent can also fall under the genus of antineoplastic, anti-inflammatory, antiplatelet, anticoagulant, antifibrin, antithrombin, antimitotic, antibiotic, antiallergic and antioxidant substances. Examples of such antineoplastics and/or antimitotics include paclitaxel (e.g. TAXOL® by Bristol-Myers Squibb Co., Stamford, Conn.), docetaxel (e.g. Taxotere®, from Aventis S. A., Frankfurt, Germany) methotrexate, azathioprine, vincristine, vinblastine, fluorouracil, doxorubicin hydrochloride (e.g. Adriamycin® from Pharmacia & Upjohn, Peapack N.J.), and mitomycin (e.g. Mutamycin® from Bristol-Myers Squibb Co., Stamford, Conn.). Examples of such antiplatelets, anticoagulants, antifibrin, and antithrombins include sodium heparin, low molecular weight heparins, heparinoids, hirudin, argatroban, forskolin, vapiprost, prostacyclin and prostacyclin analogues, dextran, D-phe-pro-arg-chloromethylketone (synthetic antithrombin), dipyridamole, glycoprotein IIb/IIIa platelet membrane receptor antagonist antibody, recombinant hirudin, and thrombin inhibitors such as Angiomax™ (Biogen, Inc., Cambridge, Mass.). Examples of such cytostatic or antiproliferative agents include angiopeptin, angiotensin converting enzyme inhibitors such as captopril (e.g. Capoten® and Capozide® from Bristol-Myers Squibb Co., Stamford, Conn.), cilazapril or lisinopril (e.g. Prinivil® and Prinzide® from Merck & Co., Inc., Whitehouse Station, N.J.); calcium channel blockers (such as nifedipine), colchicine, fibroblast growth factor (FGF) antagonists, fish oil (omega 3-fatty acid), histamine antagonists, lovastatin (an inhibitor of HMG-CoA reductase, a cholesterol lowering drug, brand name Mevacor® from Merck & Co., Inc., Whitehouse Station, N.J.), monoclonal antibodies (such as those specific for Platelet-Derived Growth Factor (PDGF) receptors), nitroprusside, phosphodiesterase inhibitors, prostaglandin inhibitors, suramin, serotonin blockers, steroids, thioprotease inhibitors, triazolopyrimidine (a PDGF antagonist), and nitric oxide. An example of an antiallergic agent is permirolast potassium. Other therapeutic substances or agents which may be appropriate include alpha-interferon, genetically engineered epithelial cells, tacrolimus, dexamethasone, and rapamycin and structural derivatives or functional analogs thereof, such as 40-O-(2-hydroxy)ethyl-rapamycin (known by the trade name of EVEROLIMUS available from Novartis), 40-O-(3-hydroxy)propyl-rapamycin, 40-O-[2-(2-hydroxy)ethoxy]ethyl-rapamycin, and 40-O-tetrazole-rapamycin.

The stent, or other implantable medical device can be used in any part of the vascular system, including neurological, carotid, coronary, renal, aortic, iliac, femoral or any other part of the peripheral vasculature. The are no limitations on the size of the stent, its length, diameter, strut thickness or pattern. Examples of such implantable devices include self-expandable stents, balloon-expandable stents, stent-grafts, grafts (e.g., aortic grafts). The coating can also be used with artificial heart valves, cerebrospinal fluid shunts, coronary shunts, pacemaker electrodes, and endocardial leads (e.g., FINELINE and ENDOTAK, available from Guidant Corporation). The underlying structure of the device can be of virtually any design. The device can be made of a metallic material or an alloy such as, but not limited to, cobalt chromium alloy (ELGILOY), stainless steel (316L), "MP35N," "MP20N," ELASTINITE (Nitinol), tantalum, nickel-titanium alloy, platinum-iridium alloy, gold, magnesium, or combinations thereof. "MP35N" and "MP20N" are trade names for alloys of cobalt, nickel, chromium and molybdenum available from standard Press Steel Co., Jenkintown, Pa. "MP35N" consists of 35% cobalt, 35% nickel, 20% chromium, and 10% molybdenum. "MP20N" consists of 50% cobalt, 20% nickel, 20% chromium, and 10% molybdenum. Devices made from bioabsorbable or biostable polymers could also be used with the embodiments of the present invention.

According to an embodiment of the present invention, the entire stent can be made of a poly(ortho ester). Such stent is expected to be completely biologically degradable and biologically absorbable. For example, the poly(ortho ester) stent can be gradually hydrolyzed as a result of its contact with blood followed by absorption by the body.

A drug, for example, EVEROLIMUS can be optionally incorporated into the poly(ortho ester) stent by mixing the drug with poly(ortho ester) followed by forming the stent out of the drug-poly(ortho ester) mixture. Alternatively, the drug can be applied on the surface of the poly(ortho ester) stent after the poly(ortho ester) stent has been formed. To apply the drug on the surface of the poly(ortho ester) stent, the drug-polymer solution can be prepared, the solution containing the drug and poly(ortho ester) in a mass ratio of about 1:3. The solution can be applied onto the surface of the poly(ortho ester) stent followed by drying.

The following examples demonstrate some embodiments of the present invention.

EXAMPLE 1

Synthesis of Poly(ethylene glycol)-co-3,9-diethylidene-2,4,8,10-tetraoxaspiro-[5,5]-undecane-co-propylene glycol (PEG-DETOSU-PG)

About 25 g (12.5 mmol) of PEG having a molecular weight ($M_w$) of about 1,000 can be placed into a 1-liter round bottom flask equipped with a mechanical stirrer. PEG can be treated to remove water by being heated to about 80° C. using an oil bath, while being stirred under vacuum of about 25 mm Hg. About 400 g of tetrahydrofuran (THF) and about 27.83 g (131 mmol) of DETOSU can be added to the flask and dissolved with continued stirring. A solution of p-toluenesulfonic acid in THF having concentration of about 25 g/l can be prepared and about 15 drops of this solution can be added to the contents of the flask. The stirring can continue for about 1 hour while the contents of the flask are maintained at about 80° C. About 8.08 g (106 mmol) of propylene glycol can then be added to the flask, and the stirring can be continued for about 1 more hour while the contents of the flask are kept at about 80° C. The reaction mixture then can be cooled and about 1 liter of hexane can be added. As a result, the polyorthoester PEG-DETOSU-PG, can be collected by filtration. The polymer can then be purified by dissolution in dry methanol and precipitation with hexane. The ratio between the soft and hard segments in the polymer is about 1:1 by mass.

EXAMPLE 2

Synthesis of Poly(ethylene glycol)-co-3,9-diethylidene-2,4,8,10-tetraoxaspiro-[5,5]-undecane-co-1,4-butanediol (PEG-DETOSU-BD)

About 25 g (12.5 mmol) of PEG having a $M_w$ of about 2,000 can be treated to remove water as described in Example 1. About 400 g of THF and about 27.83 g (131 mmol) of DETOSU can be added to the flask and dissolved with continued stirring. About 10 drops of the solution of p-toluenesulfonic acid described in Example 1 can be added to the contents of the flask. The stirring can continue for about 1 hour while the contents of the flask are maintained at about 80° C. About 8.53 g (16.67 mmol) of 1,4-butanediol can then be added to the flask, and the stirring can continue for about 1 more hour while the contents of the flask are kept at about 80° C. The reaction mixture can then be cooled and about 1 liter of hexane can be added. As a result, the polyorthoester PEG-DETOSU-BD, can be collected by filtration. The polymer can then be purified as described in Example 1. The ratio between the soft and hard segments in the polymer is about 7:3 by mass. Compared to PEG-DETOSU-PG described in Example 1, PEG-DETOSU-BD is expected to be softer, more hydrophilic, more swellable in water, and is expected to biodegrade faster.

EXAMPLE 3

Synthesis of Poly(ethylene glycol)-co-3,9-dipentyl-idene-2,4,8,10-tetraoxaspiro-[5,5]-heptadecane-co-1,6-hexanediol (PEG-DPTOSH-HD)

About 25 g (83.3 mmol) of PEG having a $M_w$ of about 300 can be treated to remove water as described in Example 1. About 400 g of THF and about 59.47 g (200.9 mmol) of DPTOSH can be added to the flask and dissolved with continued stirring. About 20 drops of the solution of p-toluenesulfonic acid described in Example 1 can be added to the contents of the flask. The stirring can continue for about 1 hour while the contents of the flask are maintained at about 80° C. About 14.21 g (122.5 mmol) of 1,6-hexanediol can then be added to the flask, and the stirring can continue for about 1 more hour while the contents of the flask are kept at about 80° C. The reaction mixture can then be cooled and about 1 liter of hexane can be added. As a result, the polyorthoester PEG-DPTOSH-HD, can be collected by filtration. The polymer can then be purified as described in Example 1. The ratio between the soft and hard segments in the polymer is about 1:1 by mass. Compared to PEG-DETOSU-PG described in Example 1, PEG-DPTOSH-HD has more hydrophobic diketene acetal and shorter PEG chains. Consequently, PEG-DPTOSH-HD is expected to be harder, more hydrophobic, adsorb less water, and is expected to biodegrade more slowly.

Structure of the polyorthoesters of Examples 1-3 described by formula (V) can be summarized as shown in Table 1.

the amount of dry residue deposited on the stent after all volatile organic compounds (e.g. the solvent) have been removed.

A second composition can be prepared by mixing the following components:
   (a) about 2 mass % of poly(D,L-lactide);
   (b) about 1 mass % of EVEROLIMUS; and
   (c) the balance, a solvent blend of acetone and trichloroethane at a mass ratio of about 1:1.

The second composition can be applied onto the dried primer to form a reservoir layer, using the same spraying technique and equipment used for applying the primer layer. Solvent can be removed by baking at about 50° C. for about one hour. The total amount of solids of the drug-polymer layer can be about 320 µg.

A third composition can be prepared by mixing the following components:
   (a) about 2 mass % of PEG-DETOSU-BD obtained as described in Example 2;
   (b) the balance, a solvent blend of acetone and cyclohexanone at a mass ratio of about 1:1.

The third composition can be applied onto the dried reservoir layer to form a topcoat layer. Solvent can be removed by baking at 50° C. for one hour. The total amount of solids of the topcoat layer can be about 100 µg.

EXAMPLE 5

A poly(ortho ester) can be synthesized of DETOSU and a diol component. The diol component can comprise a mixture of trans-cyclohexanediol and 1,6-hexanediol in the molar

TABLE 1

Structure Polyorthoesters of Examples 1-3

| No. | Polyorthoester | R | $R_1$ | $R_2$ | $R_3$ | m*) | n*) | p*) | q*) |
|---|---|---|---|---|---|---|---|---|---|
| 1 | PEG-DETOSU-PG | $CH_3$ | $CH_3$ | $(CH_2)_2$ | $(CH_2)_3$ | 22 | 25 | 1 | 106 |
| 2 | PEG-DETOSU-BD | $CH_3$ | $CH_3$ | $(CH_2)_2$ | $(CH_2)_4$ | 45 | 13 | 1 | 17 |
| 3 | PEG-DPTOSH-HD | $n\text{-}C_4H_9$ | $n\text{-}C_4H_9$ | $(CH_2)_2$ | $(CH_2)_6$ | 6 | 83 | 1 | 123 |

*)The values of m, n, p, and q are rounded to the nearest integer

EXAMPLE 4

A first composition can be prepared by mixing the following components:
   (a) about 2.0 mass % of poly(caprolactone); and
   (b) the balance, a blend of the solvents THF and xylene at a mass ratio of THF to xylene of about 3:1.

The first composition can be applied onto the surface of a bare 12 mm TETRA stent by spraying and dried to form a primer layer. An EFD spray head can be used, having a 0.014 inch round nozzle tip and a 0.028 inch round air cap with a feed pressure of about 0.2 atm (3 psi) and an atomization pressure of between about 1 atm and 1.3 atm (15 to 20 psi). The total amount of solids of the primer layer can be about 40 micrograms (µg). After spraying, the stents can be baked at about 55° C. for about one hour. "Solids" means ratio between trans-cyclohexanediol and 1,6-hexanediol being about 7:3. Synthesis as described in Example 1 can be used. The poly(ortho ester) can be dissolved in a blend of trichloroethane and tetrahydrofuran solvents having about 1:1 mass ratio between the solvents. The concentration of the poly(ortho ester) solution can be about 6% by mass. EVEROLIMUS can then be added to the poly(ortho ester) solution to form a drug-polymer solution. The mass ratio between EVEROLIMUS and poly(ortho ester) in the drug-polymer solution can be about 1:9.

A TEFLON rod having a diameter of about 3 mm can be dip coated with the poly(ortho ester) solution, in an automated fashion, using dip coating techniques and equipment known to those having ordinary skill in the art. Between dips, the rod can be dried at about 40° C. for about 1 minute. After a wall thickness of about 0.2 mm has been obtained, all of the solvent can be removed by baking in a vacuum oven overnight at ambient temperature.

The polymer tube can be slipped off the TEFLON rod and a MULTI-LINK stent pattern can be cut into the polymer tube using a laser cutter. The laser cutter can include an eximer laser and CNC mechanism to position the stent under the laser. The stent pattern can be cut out in a configuration corresponding to the fully expanded state. The self-expanding polymer stent can be then physically compressed and loaded onto a delivery catheter equipped with a guidewire lumen and retractable sleeve for deployment of the stent. Using standard percutaneous techniques, this delivery catheter can be used to deliver and deploy the stent to stenosed vasculature where an ultimate size of approximately 3 mm is desired.

While particular embodiments of the present invention have been shown and described, it will be obvious to those skilled in the art that changes and modifications can be made without departing from this invention in its broader aspects. Therefore, the appended claims are to encompass within their scope all such changes and modifications as fall within the true spirit and scope of this invention.

What is claimed is:

1. A coating for a medical device comprising:
a block copolymer having
a first block comprising a soft segment having a Tg below 37° C. wherein the soft segment is a reaction product of a spirodiketene acetal and a non-fouling moiety selected from the group consisting of a poly(alkylene glycol), poly(ethylene oxide-co-propylene oxide) (PLURONIC®), hydroxylated poly(vinyl pyrrolidone), dextran, dextrin, hyaluronic acid and derivatives thereof, poly(2-hydroxyethyl methacrylate) and mixtures thereof; and,
a second block comprising a hard segment having a Tg above 37° C. wherein the hard segment is a reaction product of a spirodiketene acetal and a $C_2$-$C_{16}$ alkylene glycol, a cycloaliphatic diol, a cyclohexanedimethanol, and an oligoaliphatic diol selected from the group consisting of diethylene glycol, triethylene glycol or tetraethylene glycol.

2. A coating for a medical device wherein the coating comprises a polymer having the formula

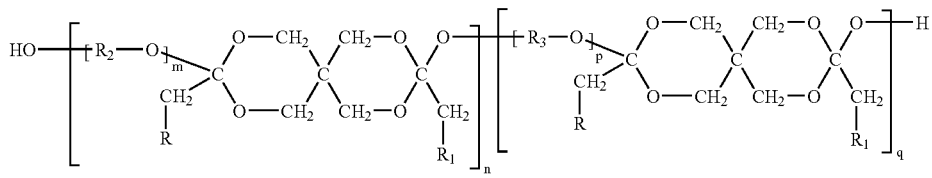

wherein R and $R_1$, are each independently a straight-chained, branched or cyclic alkyl radical $C_1$-$C_8$, or an aryl radical;

$R_2$ is selected from the group consisting of methylene (—$CH_2$—), poly(alkylene glycol), done), dextran, dextrin, hyaluronic acid, derivatives of poly(vinyl pyrrolidone), hyaluronic acid, poly(2-hydroxyethyl methacrylate), or mixtures thereof;

$R_3$ is an aliphatic group;

m, n, p, and q are all integers, where the value of m is between 5 and 500, the value of n is between 2 and 350, the value of p is 1, and the value of q is between 10 and 550; and, the "n" block has a Tg less than 37° C. and the "q" block has a Tg above 37° C.

3. The coating of claim 2, wherein $R_2$ is methylene (—$CH_2$—).

4. The coating of claim 2, wherein $R_2$ is selected from the group consisting of poly(alkylene glycol), poly(vinyl pyrrolidone), dextran, dextrin, hyaluronic acid, and poly(2-hydroxyethyl methacrylate).

5. The coating of claim 1 wherein the spirodiketene acetal is 3,9-dipentylidene-2,4,8,10-tetraoxaspiro-[5,5]-heptadecane (DPTOSH).

6. The coating of claim 1 wherein the medical device is a stent.

7. The coating of claim 1 wherein the non-fouling moiety is selected from the group consisting of poly(ethylene glycol), poly(propylene glycol), poly(tetramethylene glycol), hydroxylated poly(vinyl pyrrolidone), dextran, dextrin, hyaluronic acid and poly(2-hydroxyethyl methacrylate).

8. The coating of claim 1 wherein the alkylene glycol is selected from the group consisting of ethylene glycol, propylene glycol, butane-1,4-diol, pentane-1,5-diol, hexane-1,6-diol, heptane-1,7-diol, octane-1,8-diol, nonane-1,9-diol, decane-1,10-diol, undecane-1,11-diol, dodecane-1,12-diol, tridecane-1,13-diol, tetradecane-1,14-diol, pentadecane-1,15-diol, hexadecane-1,16-diol, butane-1,3-diol, pentane-2,5-diol and hexane-2,5-diol.

9. The coating of claim 1 wherein the spirodiketene acetal has the formula

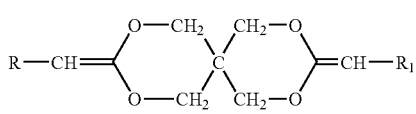

wherein R and $R_1$ are independently selected from the group consisting of straight-chained, branched, or cyclic alkyl radicals $C_1$-$C_8$, and aryl radicals.

10. The coating of claim 9 wherein the spirodiketene acetal is selected from the group consisting of 3,9-diethylidene-2,4,8,10-tetraoxaspiro-[5,5]-undecane, 3,9-dipentylidene-2,4,8,10-tetraoxaspiro-[5,5]-heptadecane, 3,9- dibutylidene-2,4,8,10-tetraoxaspiro-[5,5]-pentadecane and 3,9-dipropylidene-2,4,8,10-tetraoxaspiro-[5,5]-tridecane.

11. The coating of claim 9 wherein the alkylene glycol is selected from the group consisting of ethylene glycol, propylene glycol, butane-1,4-diol, pentane-1,5-diol, hexane-1,6-diol, heptane-1,7-diol, octane-1,8-diol, nonane-1,9-diol, decane-1,10-diol, undecane-1,11-diol, dodecane-1,12-diol, tridecane-1,13-diol, tetradecane-1,14-diol, pentadecane-1,15-diol, hexadecane-1,16-diol, butane-1,3-diol, pentane-2,4-diol and hexane-2,5-diol.

\* \* \* \* \*